US010216466B2

(12) United States Patent
Riemers et al.

(10) Patent No.: US 10,216,466 B2
(45) Date of Patent: Feb. 26, 2019

(54) SERVER SIDE DOCUMENTS GENERATED FROM A CLIENT SIDE IMAGE (71) Applicant: Red Hat, Inc., Raleigh, NC (US)

(72) Inventors: Bill Riemers, Stoney Creek (CA); Scott Coleman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 209 days.

(21) Appl. No.: 14/483,058

(22) Filed: Sep. 10, 2014

(65) Prior Publication Data
US 2016/0070676 A1 Mar. 10, 2016

(51) Int. Cl.
G06F 3/12 (2006.01)
G06F 17/30 (2006.01)

(52) U.S. Cl.
CPC .......... *G06F 3/1288* (2013.01); *G06F 3/1206* (2013.01); *G06F 3/1247* (2013.01); *G06F 17/30554* (2013.01)

(58) Field of Classification Search
CPC .... G06F 3/1288; G06F 3/1206; G06F 3/1247; G06F 17/30554
USPC ....................................................... 715/234
See application file for complete search history.

(56) References Cited

U.S. PATENT DOCUMENTS

| 7,356,768 | B1 | 4/2008 | Levy et al. |
| 7,814,475 | B2 | 10/2010 | Cohen et al. |
| 8,131,815 | B1 | 3/2012 | Perelman et al. |
| 8,184,325 | B2 | 5/2012 | Phillips et al. |
| 2007/0101262 | A1* | 5/2007 | Suzuki ................... G06F 17/211 715/207 |
| 2007/0226626 | A1* | 9/2007 | Yap ...................... G06F 17/3089 715/733 |
| 2011/0264729 | A1 | 10/2011 | Kulgavin |
| 2013/0187926 | A1* | 7/2013 | Silverstein ........... G06Q 10/105 345/440 |
| 2014/0006919 | A1 | 1/2014 | He |
| 2015/0309966 | A1* | 10/2015 | Gupta .................. G06F 17/211 715/247 |
| 2015/0358388 | A1* | 12/2015 | Devdas ................... H04L 67/06 709/219 |

OTHER PUBLICATIONS

No Author, "Export Charts to Image/PDF," fusioncharts.com, Retrieved from the Internet on Nov. 4, 2014, 4 pages, Internet: <http://docs.fusioncharts.com/charts/contents/FirstChart/ExportChart.html>.

(Continued)

*Primary Examiner* — Stephen S Hong
*Assistant Examiner* — Hope C Sheffield
(74) *Attorney, Agent, or Firm* — Lowenstein Sandler LLP (57) ABSTRACT A client receives a request for a report in a browser window. The client obtains data from a server to include in the report in view of the request and presents a graphical chart build from the obtained data in the browser window. The client receives a request for a printable version of the report while the graphical chart is being displayed in the browser window. The printable version of the report comprises a printable version of the graphical chart. The client encodes the graphical chart to a text string to send to the server for generating the printable version of the report. After sending the request for the printable report to the server, the client receives the printable version of the report from the server for presentation in the browser window.

20 Claims, 6 Drawing Sheets (56) References Cited

OTHER PUBLICATIONS

Robert Eisele, "Generate Client-Side PNG Files Using JavaScript," xarg.org, Mar. 24, 2010, 4 pages, Internet: <http://www.xarg.org/2010/03/generate-client-side-png-files-using-javascript/>.
No Author, "TX Text Control ActiveX Server > Overview > Server-Side Document Conversion," Text Control GmbH, 2014, 5 pages, Internet: <http://www.xarg.org/2010/03/generate-client-side-png-files-using-javascript/>.
No Author, "Flex :: Creating Client Side PDF with Image Using AlivePDF," www.BigResource.com, Jan. 24, 2011, 8 pages, Internet: <http://www.xarg.org/2010/03/generate-client-side-png-files-using-javascript/>.

* cited by examiner

SERVER SIDE DOCUMENTS GENERATED FROM A CLIENT SIDE IMAGE

TECHNICAL FIELD

The present disclosure is generally related to computer systems, and more particularly, to producing printable documents on a server which are generated from images in a client browser.

BACKGROUND

Customer relationship management (CRM) is a system for managing a company's interactions with current and future customers. It involves using technology to organize, automate, and synchronize sales, marketing, customer service, and technical support. Typical CRM systems are capable of aggregating large data stores that serve client based applications. CRM systems, as well as analogous systems that aggregate large data stores that may be queried by end users, can include a variety of reporting tools for end users. Reporting tools of this type are often implemented as web applications that present information to users in a browser window. Reports presented to a user in this manner are not easily rendered in a printable format without specialized software browser add-ons or extensions.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems by which a printable document may be created for display in a client browser window without the need for browser add-on software.

CRM systems, as well as analogous systems that aggregate large data stores that may be queried by end users, can include a variety of reporting tools for end users. Reporting tools of this type are often implemented as web applications that present information to users in a browser window. Reports presented to a user in this manner are not easily rendered in a printable format without specialized software browser add-ons or extensions. However, this traditionally requires specialized knowledge of computer system management that many users of CRM systems do not possess. Additionally, end users are often not permitted to implement changes required to install software on the devices they use to access the pertinent type of web applications. Moreover, specialized software to handle print formatting from a browser requires enhanced technical support to manage the installation and on-going maintenance of the add-on software, which can increase an organizations cost of ownership exponentially.

Aspects of the present disclosure address the above noted deficiency by ensuring that a printable version report displayed in a browser window can be produced for a user without requiring the installation of a dedicated browser plug-in or specialized knowledge on the part of the user. In an illustrative example, a client may receive a request for a report to be presented in a browser window. For example, a user may use a web browser as an interface to a web-based application to produce a report comprising data collected from a data store on a server. Alternatively, an automated timed event may trigger a request for a report in a web browser on a headless client (e.g., a client without a display, such as that which may be used in automated regression testing). The report may present the data from the server as a data table, a graphical chart, a combination of both a table and graphical chart, or in any other manner. In some implementations, the client may comprise a personal computing device such as a desktop computer, laptop computer, or similar device. Alternatively, the client may comprise a mobile computing device such as a mobile phone, PDA, tablet, or similar device.

In some implementations, the client may obtain data from the server to include in the report in view of the user request. For example, a client application running in the browser window may send a request to the server for the data to construct the report in the browser window. The client application may be an executable component of a web page within the browser window such as Javascript™ or similar executable code. The request may be sent to the server using an API that provides programmatic access to data stored in a data store coupled to the server. Subsequently, the client may receive the data from the server and store it locally on the client to produce the report within the browser window. For example, the client may store the received data in memory, flash memory, persistent data storage, browser cache, or any similar method for storing data to be used in a browser window.

Once the client has obtained the data from the server, it may then build a graphical chart using the obtained data in the browser window for the report. In an illustrative example, the client may first generate a scalar vector graphics chart using the collected data within the browser window. The scalar vector graphics chart may be generated within an HTML 5 canvas container using a Javascript™ tool, such as NVD3 or any other similar tool. In some implementations, the client may receive an alert from the chart generation tool to indicate that the chart has been generated so that the client may present the chart in the browser window. Alternatively, the client may monitor the changes in size of the chart data during generation of the chart to determine when the chart has been completed. The size of the chart data can be measured by the actual data size of the underlying data (e.g. in bytes, megabytes, etc.), the size of the definition block, or the like. For example, the client may first determine the size of the chart data within the browser window. The client can then set an interval timer to recheck the size of the chart data. The interval timer can be set in minutes, seconds, CPU clock cycles, or any other similar manner. Upon expiration of the interval timer, the client can recheck the size of the chart data to determine whether the chart generation has completed. If the client determines that the size of the chart has not increased, then the chart has completed generation and the client can present the scalar vector graphics chart in the browser window. If the client determines that the size of the chart has increased, the client can reset the interval timer and repeat the cycle until the size of the chart does not change, thereby indicating that the chart generation has completed.

In some implementations, in order to produce a chart that is easily presented in a printable version of a report, the scalar vector graphics chart can be converted to an image data file. For example, the client can use an API such as CANVG to convert the scalar vector graphics chart to a Canvas chart. The client can then replace the scalar vector graphics chart with a Canvas chart in the browser window. An image data file can comprise image data stored in memory blobs, database blobs, cached memory, or any other similar manner.

Once the graphical chart has been created from the obtained data, the client may present the chart in the browser window. In some implementations, the obtained data may be presented as a table in the same browser window as the graphical chart. Subsequently, the user may submit a request for a printable version of the report that is presented in the browser window while the user is viewing it. The user may submit the request by clicking a button, selecting a menu option, pressing a sequence of keys on an input device, or any other similar manner. Alternatively, an automated timed event may trigger the request on a headless client (e.g., a client without a display, such as that which may be used in automated regression testing). The printable version of the report can comprise the printable version of the graphical chart, the obtained data in table form that was used to generate the graphical chart, or a combination of the two.

Once the client has received the request from the user (or timed event) to produce a printable version of the report, the client may first encode the graphical chart to send to a server. In some implementations, the client may encode the binary information from the graphical chart to a text string expressed in a base-64 format. For example, the client can invoke a canvas.toDataURL('image/png') call from a Javascript™ module to copy the image as a URL into an HTML form field in order to pass the image data to a server for processing.

Subsequently, the client can then send a request to the server to produce the printable version of the report. The client request can comprise the data from the encoded graphical chart combined with the obtained data used to generate the chart. Upon receiving the request, the server can decode the graphical chart to an image data file and save the image data file to a data store on the server. The data store may be persistent storage such as a hard disk, a network attached relational database, a database locally attached to the server, a memory space accessible to the server, or the like.

When the image data file is saved to the data store, a unique identifier can be generated to associate the image and obtained data with the user that submitted the request. In one illustrative example, the unique identifier comprises a combination of the user's application userid and the minute of the hour of the day. For example, a request submitted by user ABC at 10 minutes after the hour can result in a unique id of 'ABC10'. The server can then store the obtained data associated with the graphical chart to a memory space accessible to the server, indexed by the same unique identifier. The server can then use the graphical chart and associated data to generate a printable document that can be returned to the client. The printable document can be formatted as a PDF or any other similar document that is suitable for printing on a printer without requiring additional post-processing. The server can then archive the printable document on the server data store, send the printable document to another service or client (e.g., via email, direct download, ftp, etc.), or send the printable document to the browser window on the client. The client can present the document in the browser window upon receipt from the server.

Aspects of the present disclosure are thus capable of created a printable version of a report that is displayed in a browser window. More particularly, aspects of the present disclosure facilitate generation of a printable version of a report without requiring special add-on software to a web browser or special knowledge on the part of the user.

Figure 1:
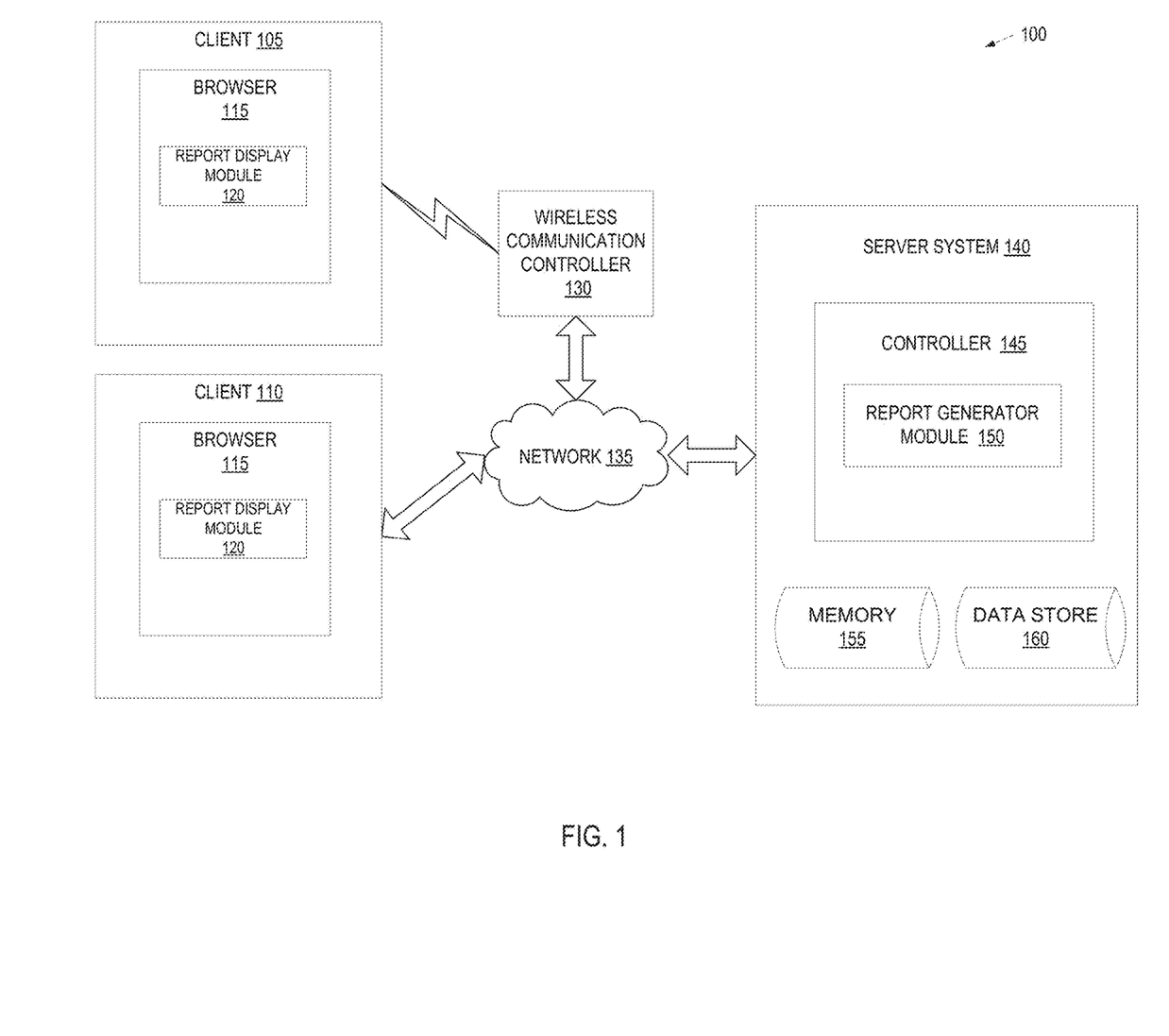
FIG. 1 depicts a high-level component diagram of an example network architecture, in accordance with one or more aspects of the present disclosure.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 may include a server system 140 and one or more clients 105-110 capable of communicating with the server system 140 via a network 135 (e.g., a public network such as the Internet or a private network such as a local area network (LAN)) and/or a wireless communication controller 130. In one illustrative example, a client 105 may connect to server system 140 via the wireless communications controller 130 and network 135. Alternatively, a client 110 may connect to server system 140 via network 135.

In an illustrative example, the clients 105-110 may comprise computing devices that have a wide range of processing capabilities. The clients 105-110 may be variously configured with different functionality to connect to a web application via a browser window. The clients 105-110 may include any type of internet accessible devices such as mobile phones, laptop computers, portable media players, tablet computers, netbooks, notebooks, desktop computers, and the like. For example, client 105 can be a mobile device and client 110 can be a desktop computer connected to a network.

In certain implementations, one or more of the clients 105-110 can comprise a browser 115. The browser 115 may be any commercially available web browser that provides access to web applications. For example, browser 115 may be a software product such as Internet Explorer, Chrome, Safari, Firefox, or any other similar product. In certain implementations, browser 115 on a client 105 may be a mobile device version of a browser application, such as Mobile Safari on an Apple® iOS device.

Browser 115 may comprise a report display module 120. The report display module 120 may handle processing involved in the generation of a report displayed within a browser window. In certain implementations, report display module 125 may send a request to server 140 to obtain data saved on the server system 140. Report display module 125 may then use the obtained data to display a table and graphical chart within the web browser. Report display module 120 may also handle the processing involved in sending a request to server system 140 for a printable version of the report, as described in detail below with respect to FIGS. 3 and 4.

Clients 105-110 may connect to the server system 140 via a wireless communication controller 130. The wireless communication controller 130 may provide a wireless infrastructure that allows users to use client 105 to interact with server system 140 without being tethered via hardwired links. The wireless communications controller 130 may be wireless fidelity (WiFi) hotspots connected with the network 135. The wireless communication controller 130 may alternatively be a wireless carrier system (e.g., as provided by Verizon®, AT&T®, T-Mobile®, etc.) that can be implemented using various data processing equipment, communication towers, etc.

The server system 140 may include one or more machines (e.g., one or more server computer systems, routers, gateways, etc.). In one illustrative example, the server system 140 can include one or more cloud based servers (such as server systems made accessible to network connectivity via the internet or wireless carrier systems), which may be hosted, for example, by cloud based hosting services.

In some implementations, server system 140 may include a controller 145, a memory 155, and a data store 160. Controller 145 may be configured to process requests received from clients 105-110, such as to produce data from data store 160 or to produce a printable version of a report displayed in a web browser. Controller 145 may comprise a report generator module 150 that can generate a printable version of a report in view of a request from clients 105-110, as described in detail below with respect to FIG. 5. The data store 160 may share the physical hardware with the server system 140 (one or more hard disk drives, solid-state drives, etc. within the server hardware) or be an independent device coupled to the server system directly or via a network (e.g., as a network-attached storage device (NAS)). Memory 155 may comprise volatile memory devices (e.g., random access memory (RAM)), non-volatile memory devices (e.g., flash memory) and/or other types of memory devices.

Figures 2A, 2B:
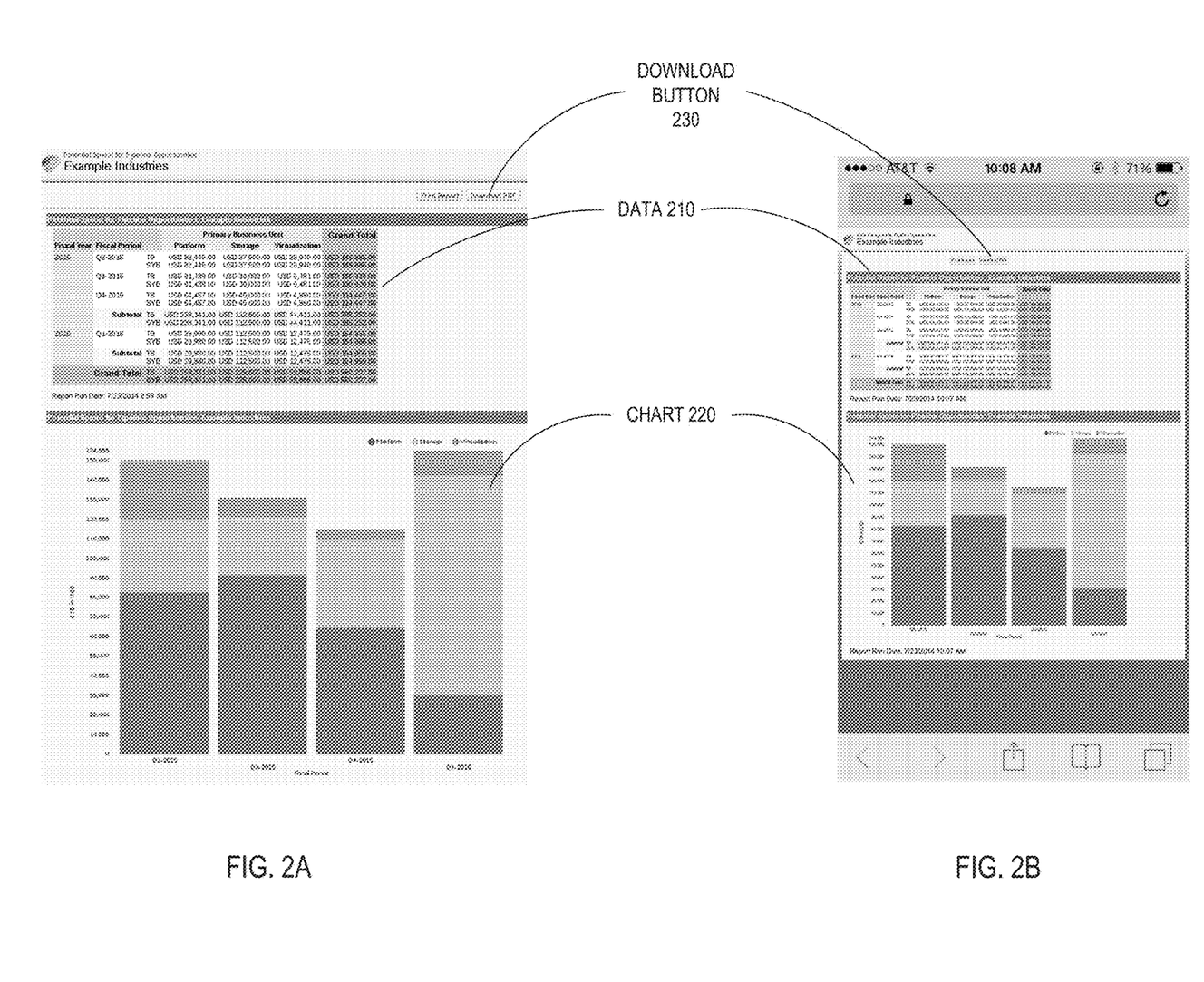
FIGS. 2A-2B illustrate examples of various representations of a browser-based report operating in accordance with one or more aspects of the present disclosure.

FIGS. 2A and 2B illustrate various representations of a browser-based report operating in accordance with one or more aspects of the present disclosure. FIG. 2A illustrates an example of a report within a browser window that executes on a personal computing device such as a desktop computer, laptop computer, or other similar device. FIG. 2B illustrates an example of a report within a browser window that executes on a mobile computing device such as a mobile phone, tablet, or other similar device. Data 210 represents the obtained data received by the client and chart 220 represents the graphical chart built from the obtained data, as outlined above. In FIGS. 2A-B, data 210 is presented in table form, but can be alternatively presented as a list or other similar method. Download button 230 can be presented to permit the user to submit a request to the server for a printable version of the report displayed to the user in the web browser.

Figure 3:
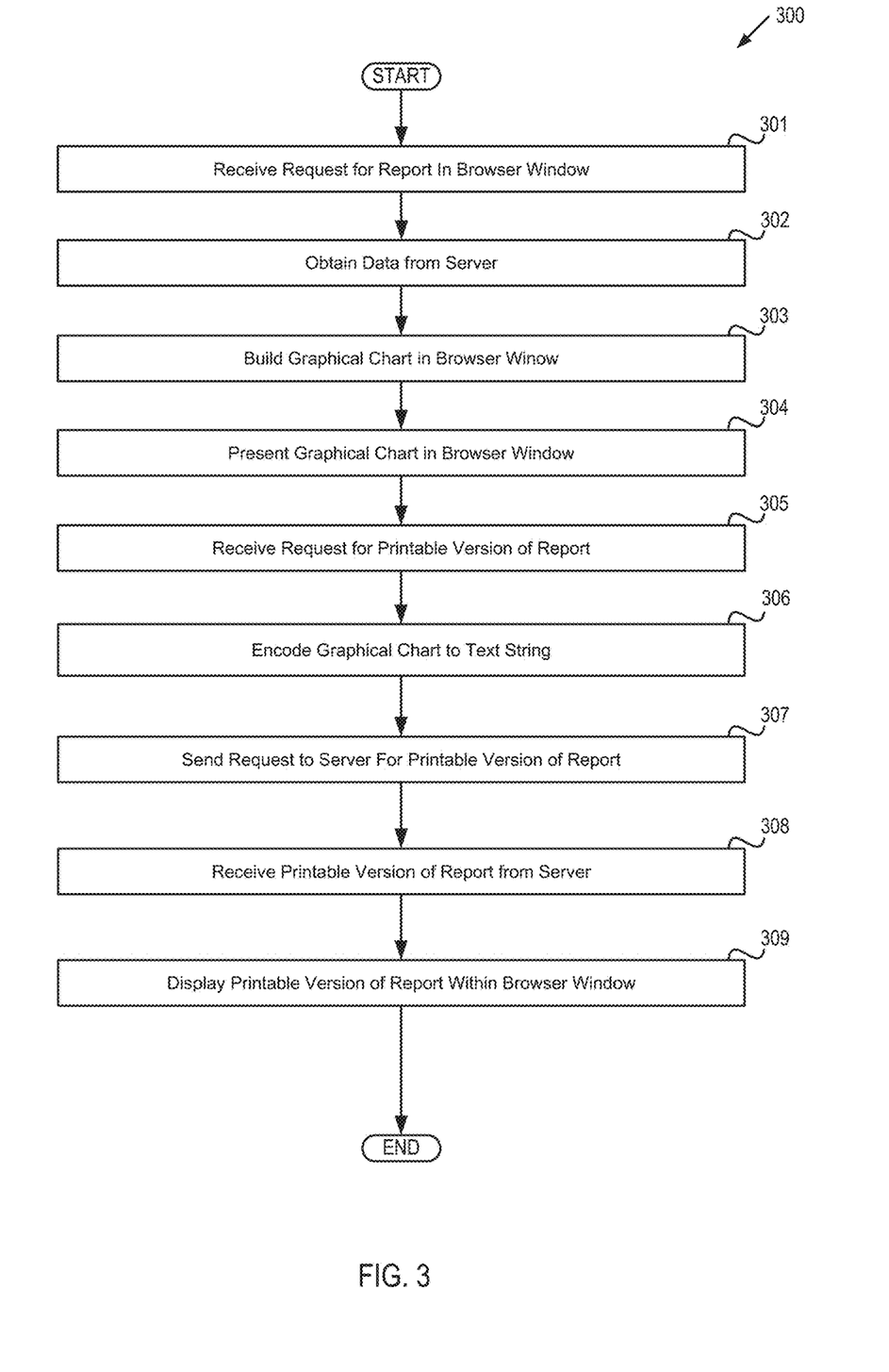
FIG. 3 depicts a flow diagram of a method by which a client may generate a printable version of a report displayed in a web browser, in accordance with one or more aspects of the present disclosure.

FIG. 3 depicts a flow diagram of an example method 300 by which a client may generate a printable version of a report displayed in a web browser. The method may be performed by processing logic that may comprise hardware (circuitry, dedicated logic, etc.), software (such as is run on a general purpose computer system or a dedicated machine), or a combination of both. In one illustrative example, method 300 may be performed by report display module 120 of browser 115 in FIG. 1. Alternatively, some or all of method 300 might be performed by another machine. It should be noted that blocks depicted in FIG. 3 could be performed simultaneously or in a different order than that depicted.

At block 301, processing logic receives a request for a report in a browser window. For example, a user may use a web browser as an interface to a web-based application to produce a report comprising data collected from a data store on a server. Alternatively, an automated timed event may trigger a request for a report in a web browser on a headless client (e.g., a client without a display, such as that which may be used in automated regression testing). The report may present the data from the server as a data table, a graphical chart, a combination of both a table and graphical chart, or in any other manner. In some implementations, the client may comprise a personal computing device such as a desktop computer, laptop computer, or similar device. Alternatively, the client may comprise a mobile computing device such as a mobile phone, PDA, tablet, or similar device.

At block 302, processing logic obtains data from a server to include in the report in view of the request received at block 301. For example, processing logic running in the browser window may send a request to the server for the data to construct the report in the browser window. The processing logic may be an executable component of a web page within the browser window such as Javascript™ or similar executable code. The request may be sent to the server using an API that provides programmatic access to data stored in a data store coupled to the server. Subsequently, processing logic may receive the data from the server and store it locally on the client to produce the report within the browser window. For example, processing logic may store the received data in memory, flash memory, persistent data storage, browser cache, or any similar method for storing data to be used in a browser window.

At block 303, processing logic builds a graphical chart using the obtained data in the browser window. For example, processing logic may generate a scalar vector graphics chart using the collected data within the browser window. At block 304, processing logic presents the graphical chart built from the obtained data in the browser window. In some implementations, the obtained data may be presented to the user as a table in the same browser window as the graphical chart.

At block 305, processing logic receives a request for a printable version of the report being displayed in the browser window. A user may submit the request by clicking a button, selecting a menu option, pressing a sequence of keys on an input device, or any other similar manner. Alternatively, an automated timed event may trigger the request in a web browser on a headless client (e.g., a client without a display, such as that which may be used in automated regression testing). The printable version of the report can comprise the printable version of the graphical chart, the obtained data in table form that was used to generate the graphical chart, or a combination of the two.

At block 306, processing logic encodes the graphical chart to a text string to send to the server for generating the printable version of the report. In some implementations, processing logic may encode the binary information from the graphical chart to a text string expressed in a base-64 format. For example, processing logic can invoke a canvas.toDataURL('image/png') call from a Javascript™ module to copy the image as a URL into an HTML form field in order to pass the image data to a server for processing.

At block 307, processing logic sends a request to the server for the printable version of the report. The request can comprise the data from the encoded graphical chart combined with the obtained data used to generate the chart. Upon receiving the request, the server can generate the printable version of the report and send it to the browser window. At block 308, processing logic receives the printable version of the report from the server. At block 309, processing logic displays the printable version of the report within the browser window to the user.

After block 309, the method of FIG. 3 terminates.

Figure 4:
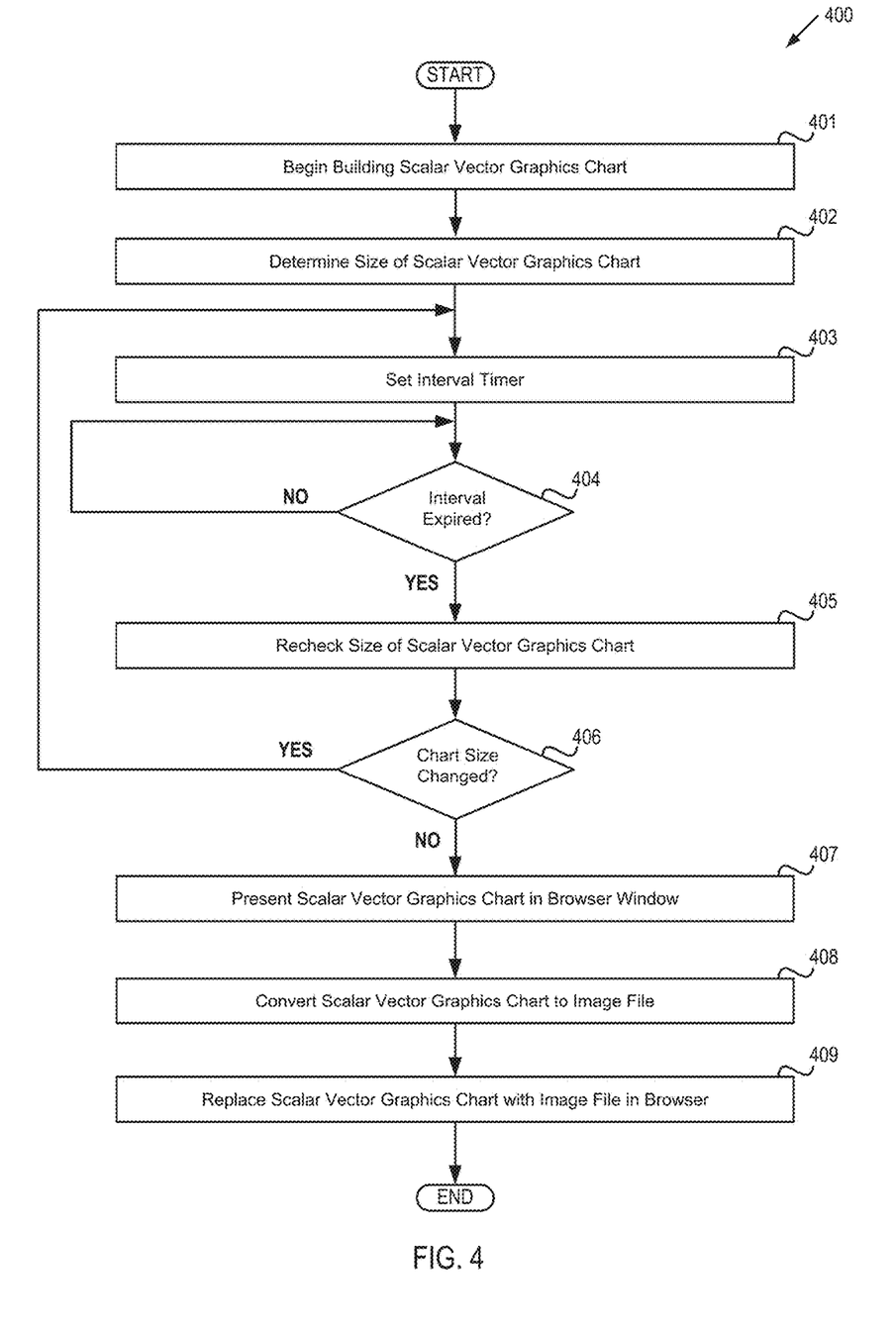
FIG. 4 depicts a flow diagram of a method by which a graphical chart is generated within a browser window, in accordance with one or more aspects of the present disclosure.

FIG. 4 depicts a flow diagram of an example method 400 by which a graphical chart is generated within a browser window. The method may be performed by processing logic that may comprise hardware (circuitry, dedicated logic, etc.), software (such as is run on a general purpose computer system or a dedicated machine), or a combination of both. In one illustrative example, method 400 may be performed by report display module 120 of browser 115 in FIG. 1. Alternatively, some or all of method 400 might be performed by another machine. It should be noted that blocks depicted in FIG. 4 could be performed simultaneously or in a different order than that depicted.

At block 401, processing logic begins building a scalar vector graphics chart using data obtained from the server. The scalar vector graphics chart may be generated within an HTML 5 canvas container using a Javascript™ tool, such as NVD3 or any other similar tool.

At block 402, processing logic determines the size of the scalar vector graphics chart within the browser window. The size of the chart can be measured by the actual data size of the underlying data (e.g. in bytes, megabytes, etc.), the size of the definition block, or the like. At block 403, processing logic sets an interval timer to recheck the size of the chart data. The interval timer can be set in minutes, seconds, CPU clock cycles, or any other similar manner.

At block 404, processing logic determines whether the interval set at block 403 has expired. Upon expiration of the interval processing logic proceeds to block 405, otherwise processing logic returns to block 404.

At block 405, processing logic rechecks the size of the scalar vector graphics chart. At block 406, processing logic determines whether the size of the chart has changed to determine whether the chart generation has completed. If the size of the chart has not increased, then the chart generation has completed and processing logic proceeds to block 407. Otherwise, the chart generation has not completed, and processing logic returns to block 403 to reset the interval timer and repeat the cycle until the size of the chart does not change, thereby indicating that the chart generation has completed.

At block 407, processing logic presents the scalar vector graphics chart in the browser window. At block 408, processing logic converts the scalar vector graphics chart to an image data file. For example, processing logic can use an API such as CANVG to convert the scalar vector graphics chart to a Canvas chart. At block 409, processing logic replaces the scalar vector graphics chart with the image data file in the browser window. An image data file can comprise image data stored in memory blobs, database blobs, cached memory, or any other similar manner.

After block 409, the method of FIG. 4 terminates.

Figure 5:
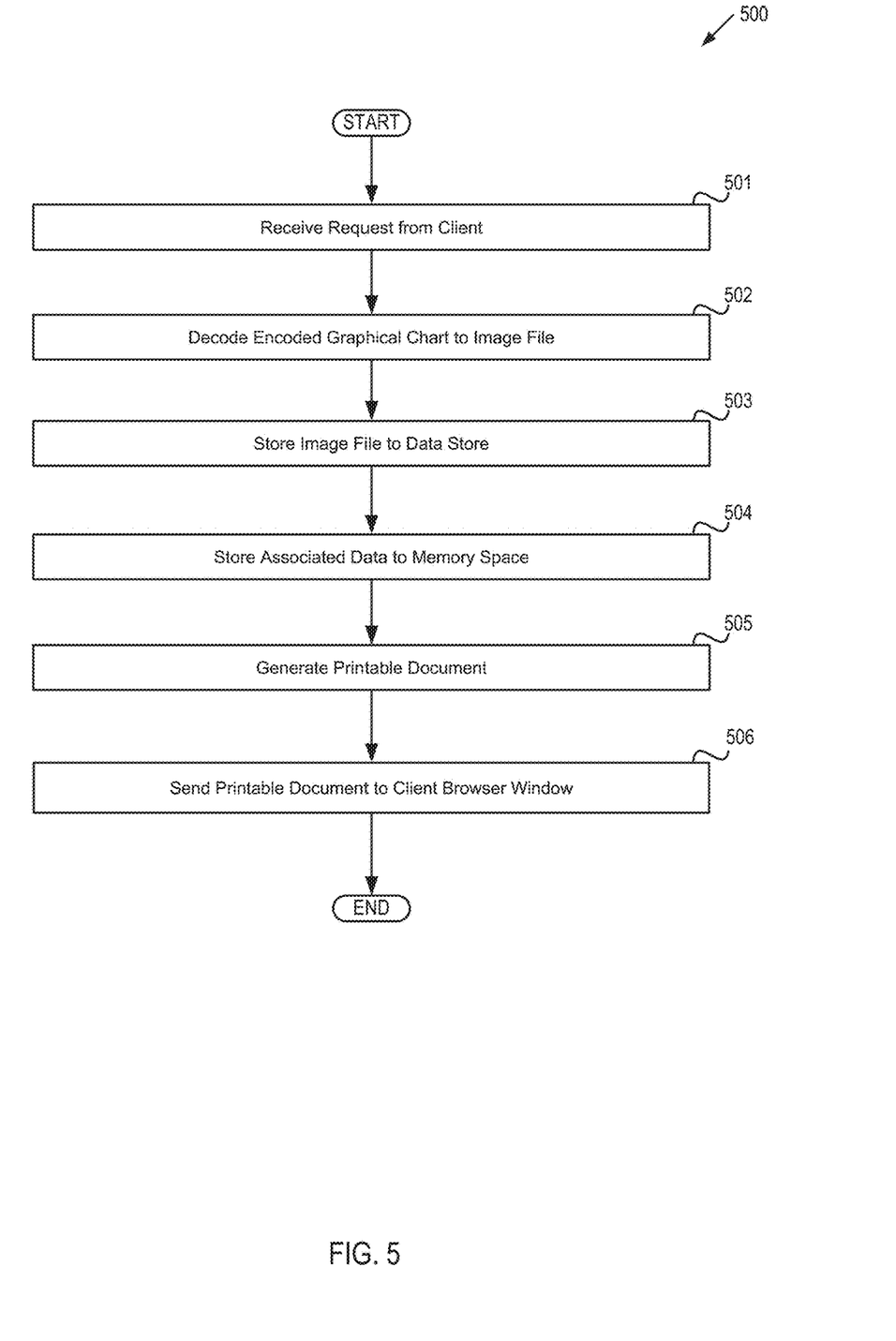
FIG. 5 depicts a flow diagram of a method by which a server can generate a printable version of a report received from a client, in accordance with one or more aspects of the present disclosure.

FIG. 5 depicts a flow diagram of an example method 500 by which a server can generate a printable version of a report received from a client. The method may be performed by processing logic that may comprise hardware (circuitry, dedicated logic, etc.), software (such as is run on a general purpose computer system or a dedicated machine), or a combination of both. In one illustrative example, method 500 may be performed by report generator module 150 of controller 145 in FIG. 1. Alternatively, some or all of method 500 might be performed by another machine. It should be noted that blocks depicted in FIG. 5 could be performed simultaneously or in a different order than that depicted.

At block 501, processing logic receives a request from a client to produce a printable version of a report displayed in a client web browser. The request can comprise the data from the encoded graphical chart combined with the obtained data used to generate the chart. At block 502, processing logic decodes the encoded graphical chart to create an image data file.

At block 503, processing logic stores the image data file from block 502 to a data store accessible by the server. The data store may be persistent storage such as a hard disk, a network attached relational database, a database locally attached to the server, a memory space accessible to the server, or the like. When the image data file is saved to the data store, processing logic can generate a unique identifier to associate the image and associated data with the user that submitted the request. In one illustrative example, the unique identifier comprises a combination of the user's userid and the minute of the hour of the day. For example, a request submitted by user ABC at 10 minutes after the hour can result in a unique id of 'ABC10'.

At block 504, processing logic stores the data associated with the graphical chart to a memory space accessible by the server. The associated data can be stored and indexed by the same unique identifier created at block 503. At block 505, processing logic generates a printable document comprising the graphical chart and the associated data. The printable document can be formatted as a PDF or any other similar document that is suitable for printing on a printer without requiring additional post-processing. At block 506, processing logic sends the printable document to the client browser window. Here, processing logic may additionally or alternatively archive the printable document on the server data store or send the printable document to another service or client (e.g., via email, direct download, ftp, etc.).

After block 506, the method of FIG. 5 terminates.

Figure 6:
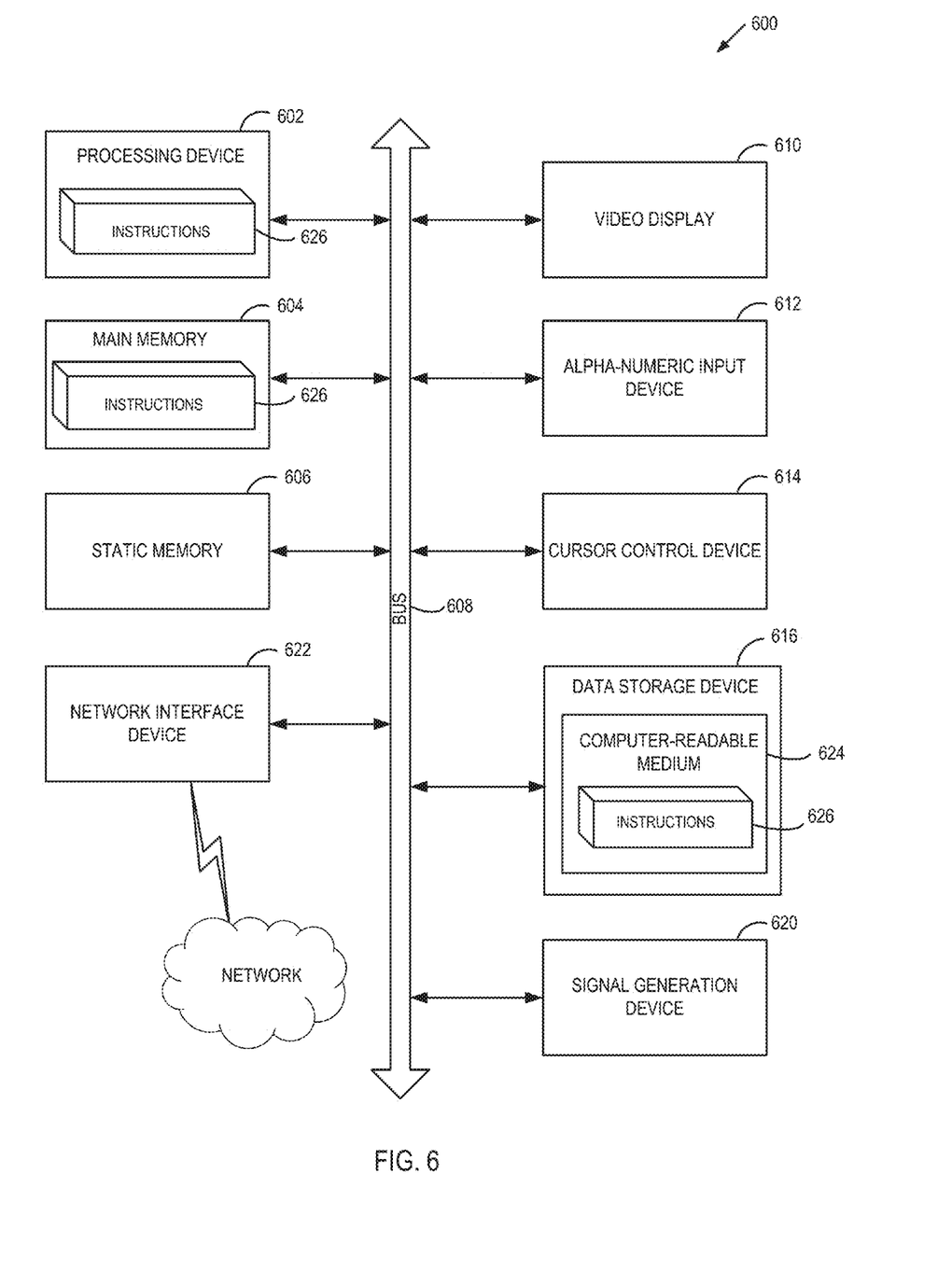
FIG. 6 depicts a block diagram of an illustrative computer system operating in accordance with examples of the invention.

FIG. 6 depicts an example computer system 600 which can perform any one or more of the methods described herein. In one example, computer system 600 may correspond to network architecture system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the method of FIGS. 3-4) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
receiving, by a processing device of a client, a first request for a report in a browser window;
obtaining, by the processing device of the client, data from a server to include in the report in view of the first request;
presenting, by the processing device of the client in the browser window, a graphical chart generated from the data upon determining, without contacting the server, that a first memory size of chart data of the graphical chart is the same as a second memory size of the chart data determined previously by the processing device, wherein the chart data is stored at one or more memory locations, and the first memory size and the second memory size are determined by measuring the chart data at the one or more memory locations;
receiving, by the processing device of the client, a second request for a printable version of the report while the graphical chart is being presented in the browser window, wherein the printable version of the report comprises a printable version of the graphical chart;
encoding the graphical chart to a text string to send to the server for generating the printable version of the report;
sending a third request to the server to generate a document comprising the printable version of the report, wherein the third request comprises the encoded text string and the data used to build the graphical chart; and
receiving the document comprising the printable version of the report from the server for presentation in the browser window.

2. The method of claim 1 further comprising, subsequent to obtaining the data and prior to presenting the graphical chart, generating, using the data, the graphical chart for the report.

3. The method of claim 2, wherein generating the graphical chart comprises:
generating a scalar vector graphics chart using the collected data within the browser window; and
converting the scalar vector graphics chart to an image data file.

4. The method of claim 3, wherein generating the scalar vector graphics chart comprises:
determining the second memory size of the chart data of the scalar vector graphics chart;
setting an interval timer to a period of time;
determining the first memory size of the chart data upon expiration of the period of time of the interval timer; and
presenting the scalar vector graphics chart in the browser window upon determining that the first memory size of the chart data has not increased from the second memory size of the chart data.

5. The method of claim 1, wherein obtaining the data comprises:
sending a fourth request to the server for the data to construct the report;
receiving the data from the server; and
storing, the collected data on the client.

6. The method of claim 1, wherein receiving the printable version of the report comprises:
receiving the printable version of the report from the server; and displaying the printable version of the report within the browser window.

7. The method of claim 6, wherein the server is to:
decode the encoded graphical chart to an image data file;
store the image data file to a data store;
store the data associated with the graphical chart to a memory space;
generate a printable document comprising the image data file and the data; and
send the printable document to the browser window.

8. A computing apparatus comprising:
a memory; and
a processing device, operatively coupled to the memory, to:
receive, by a client, a first request for a report in a browser window;
obtain, by the client, data from a server to include in the report in view of
the first request;
present, by the client in the browser window, a graphical chart generated from the data upon determining, without contacting the server, that a first memory size of chart data of the graphical chart is the same as a second memory size of the chart data determined previously by the processing device, wherein the chart data is stored at one or more memory locations in the memory, and the first memory size and the second memory size are determined by measuring the chart data at the one or more memory locations in the memory;
receive, by the client, a second request for a printable version of the report while the graphical chart is being presented in the browser window, wherein the printable version of the report comprises a printable version of the graphical chart;
encode the graphical chart to a text string to send to the server for generating the printable version of the report;
send a third request to the server to generate a document comprising the printable version of the report, wherein the third request comprises the encoded text string and the data used to build the graphical chart; and
receive the document comprising the printable version of the report from the server for presentation in the browser window.

9. The apparatus of claim 8, wherein the processing device is further to, subsequent to obtaining the data and prior to presenting the graphical chart, generate, using the data, the graphical chart for the report.

10. The apparatus of claim 9, wherein to generate the graphical chart, the processing device is to:
generate a scalar vector graphics chart using the collected data within the browser window; and
convert the scalar vector graphics chart to an image data file.

11. The apparatus of claim 10, wherein to generate the scalar vector graphic chart, the processing device is to:
determine the second memory size of chart data of the scalar vector graphics chart;
set an interval timer to a period of time;
determine the first memory size of the chart data upon expiration of the period of time of the interval timer; and
present the scalar vector graphics chart in the browser window upon determining that the first memory size of the chart data has not increased from the second memory size of the chart data.

12. The apparatus of claim 8, wherein to receive the printable version of the report, the processing device is to:
receive the printable version of the report from the server; and
display the printable version of the report within the browser window.

13. A system comprising the apparatus of claim 12, wherein the server is to:
decode the encoded graphical chart to an image data file;
store the image data file to a data store;
store the data associated with the graphical chart to a memory space;
generate a printable document comprising the image data file and the data; and
send the printable document to the browser window.

14. A non-transitory computer readable storage medium, having instructions stored therein, which when executed by a processing device of a client, cause the processing device of the client to:
receive, by the processing device of the client, a first request for a report in a browser window;
obtain, by the processing device of the client, data from a server to include in the report in view of the first request;
present, by the processing device of the client in the browser window, a graphical chart generated from the data upon determining, without contacting the server, that a first memory size of chart data of the graphical chart is the same as a second memory size of the chart data determined previously by the processing device, wherein the chart data is stored at one or more memory locations, and the first memory size and the second memory size are determined by measuring the chart data at the one or more memory locations;
receive, by the processing device of the client, a second request for a printable version of the report while the graphical chart is being presented in the browser window, wherein the printable version of the report comprises a printable version of the graphical chart;
encode the graphical chart to a text string to send to the server for generating the printable version of the report;
sending a third request to the server to generate a document comprising the printable version of the report, wherein the third request comprises the encoded text string and the data used to build the graphical chart; and
receive the document comprising the printable version of the report from the server for presentation in the browser window.

15. The non-transitory computer readable storage medium of claim 14, wherein the processing device is further to, subsequent to obtaining the data and prior to presenting the graphical chart, generate, using the data, the graphical chart for the report.

16. The non-transitory computer readable storage medium of claim 15, wherein to generate the graphical chart the processing device is to:
generate a scalar vector graphics chart using the collected data within the browser window; and
convert the scalar vector graphics chart to an image data file.

17. The non-transitory computer readable storage medium of claim 16, wherein to generate the scalar vector graphics chart the processing device is to:
determine the second memory size of chart data of the scalar vector graphics chart;
set an interval timer to a period of time;
determine the first memory size of the chart data upon expiration of the period of time of the interval timer; and
present the scalar vector graphics chart in the browser window upon determining that the first memory size of the chart data has not increased from the second memory size of the chart data.

18. The non-transitory computer readable storage medium of claim 14, wherein to obtain the data the processing device is to:
send a fourth request to the server for the data to construct the report;
receive the data from the server; and
store the collected data on the client.

19. The non-transitory computer readable storage medium of claim 14, wherein to receive the printable version of the report the processing device is to:
receive the printable version of the report from the server; and
display the printable version of the report within the browser window.

20. The non-transitory computer readable storage medium of claim 19, wherein the server is to:
decode the encoded graphical chart to an image data file;
store the image data file to a data store;
store the data associated with the graphical chart to a memory space;
generate a printable document comprising the image data file and the data; and
send the printable document to the browser window.

* * * * *